United States Patent [19]
Clifford

[11] Patent Number: 5,524,577
[45] Date of Patent: Jun. 11, 1996

[54] ROTARY ENGINE

[76] Inventor: Colin A. Clifford, 12 Mamzill Street, Sunnybank Hills, Queensland 4109, Australia

[21] Appl. No.: 302,854
[22] PCT Filed: Mar. 16, 1993
[86] PCT No.: PCT/AU93/00108
    § 371 Date: Sep. 16, 1994
    § 102(e) Date: Sep. 16, 1994
[87] PCT Pub. No.: WO93/19284
    PCT Pub. Date: Sep. 30, 1993

[30] Foreign Application Priority Data

Mar. 16, 1992 [AU] Australia ................ PL1369

[51] Int. Cl.⁶ ............................. F02B 57/04
[52] U.S. Cl. ............................. 123/44 D
[58] Field of Search ....................... 123/44 D

[56] References Cited

U.S. PATENT DOCUMENTS

| | | | |
|---|---|---|---|
| 1,331,749 | 2/1920 | Freer | 123/44 D |
| 2,181,705 | 11/1939 | Meyer | 123/44 D |
| 2,234,187 | 3/1941 | Meyer et al. | 123/44 D |
| 2,242,231 | 5/1941 | Cantoni . | |
| 3,921,602 | 11/1975 | Froumajou | 123/44 D |
| 3,971,349 | 7/1976 | Froumajou | 123/44 D |
| 4,010,719 | 3/1977 | Lappa | 123/44 D |
| 4,077,365 | 3/1978 | Schlueter | 123/44 D |

FOREIGN PATENT DOCUMENTS

| | | |
|---|---|---|
| 130732 | 7/1919 | United Kingdom . |
| 510679 | 8/1939 | United Kingdom ......... 123/44 D |
| 536875 | 5/1941 | United Kingdom . |
| 537824 | 7/1941 | United Kingdom . |
| 1014764 | 12/1965 | United Kingdom . |
| 1446852 | 8/1976 | United Kingdom . |

Primary Examiner—Michael Koczo
Attorney, Agent, or Firm—Helfgott & Karas

[57] ABSTRACT

A radial engine assembly (10) includes a crankcase (12) supporting an annular cylinder closure means (23) having a part-spherical sealing surface (26). A crankshaft (11) supported by the crankcase (12) operates piston (32) within radial cylinders of a coplanar cylinder assembly (20). The crankshaft (11) and the cylinder assembly (20) are geared for reverse rotation. A main connecting rod (16) is journalled to the crankshaft (11) and the other connecting rods (17) are journalled to the main connecting rod (16). Circumferentially extending inlet ports (60, 61) communicate respectively with primary and secondary barrels of a fuel/air supply device.

4 Claims, 11 Drawing Sheets

ROTARY ENGINE

BACKGROUND OF THE INVENTION

This invention relates to radial engines.

This invention has particular but not exclusive application to internal combustion engines, and for illustrative purposes particular reference will be made to such application. However, it is to be understood that this invention could be used in other applications, such as fluid compressors or pumps which are embraced hereinafter by the term "engine".

Currently, most engine designs use circular-section single acting pistons supported by a crankshaft for reciprocation within cylinders to and from a cylinder head against which the combustion pressures react or the fluid is compressed. Such designs have been favored primarily because of the simplicity of sealing against gas pressure between circular pistons and circular cylinders bores. The concentration of engineering development of piston engines has maintained this design in the premier position among internal combustion engines and compressors for many years.

However, such engines have a number of disadvantages, including large size and weight relative to output power and, in many instances, inherent vibration. They also suffer from friction losses due to the reciprocal motion of the pistons which results in wear and power consumption on the side thrust faces of the pistons and cylinders. They are also relatively complex due to the need, in their most common four-stroke form, to provide inlet and outlet poppet valves and associated operating mechanisms for each cylinder. Known radial engines have the disadvantage that they are even more complex due to the requirement to provide individual drives to each of the spaced cylinder heads for the respective inlet and outlet valves.

SUMMARY OF THE INVENTION

The present invention aims to alleviate the above and other disadvantages and to provide engines which will be reliable and efficient in use. Other objects and advantages of this invention will hereinafter become apparent.

With the foregoing and other objects in view, this invention in one, aspect directed to four stroke engines resides broadly in an engine assembly including:

a crankcase assembly;

a crankshaft assembly supported by said crankcase assembly;

a cylinder assembly rotatable relative to said crankcase assembly about said crankshaft assembly, said cylinder assembly having a plurality of cylinders disposed radially about the crankshaft assembly;

respective piston assemblies connected to said crankshaft assembly for operation within said cylinders;

cylinder closure means supported by said crankcase assembly for closing said cylinders, and timing means interconnecting the crankshaft assembly to the cylinder assembly such that said cylinder assembly may rotate in an opposite direction to said crankshaft assembly at a rotational speed substantially equal to the rotational speed of said crankshaft assembly divided by the number of cylinders;

inlet and outlet ports to said cylinders through which fluid may be introduced into or expelled from said cylinders extending substantially radially through the cylinder closure means and the ports being grouped in pairs of circumferentially spaced inlet and exhaust ports, the number of pairs of circumferentially spaced groups of inlet and exhaust ports being half of one more than the number of cylinders and each inlet port including a plurality of circumferentially extending slots at least two of which are positioned so as to provide variable inlet timing.

This invention in a second aspect directed to two stroke engines resides broadly in an engine assembly including:

a crankcase assembly;

a crankshaft assembly supported by said crankcase assembly;

a cylinder assembly rotatable relative to said crankcase assembly about said crankshaft assembly, said cylinder assembly having a plurality of cylinders disposed radially about the crankshaft assembly;

respective piston assemblies connected to said crankshaft assembly for operation within said cylinders;

cylinder closure means supported by said crankcase assembly for closing said cylinders, and timing means interconnecting the crankshaft assembly to the cylinder assembly such that said cylinder assembly may rotate in an opposite direction to said crankshaft assembly at a rotational speed substantially equal to the rotational speed of said crankshaft assembly divided by the number of cylinders;

inlet and outlet ports to said cylinders through which fluid may be introduced into or expelled from said cylinders extending substantially radially through the cylinder closure means and the ports being grouped in pairs of circumferentially spaced inlet and exhaust posts, the number of pairs of circumferentially spaced groups of inlet and exhaust ports being one more than the number of cylinders and each inlet port including a plurality of circumferentially extending slots at least two of which are positioned so as to provide variable inlet timing.

The cylinder walls could be formed with ports adapted to communicate with inlet and outlet ports in a side wall or opposed side walls associated with the crankcase assembly such that for example the fuel supply means could be supported adjacent one of the crankshaft and the exhaust manifold disposed adjacent the other end of the crankshaft. Preferably however, the cylinders communicate with inlet and outlet ports arranged radially outwardly of the cylinder assembly.

The inlet and outlet ports could be independent of cylinder closure means fixed to the cylinder assembly or they could be arranged in cylinder closure means fixed to the crankcase and within which the cylinder assembly rotates. In either case it is preferred that the radially outer surface surrounding each cylinder or closure means fixed thereto includes a part spherical outer portion and the radially inner surface of the member in which the inlet and outlet ports are contained and which engages with the aforementioned part spherical surface is also part Spherical with the centres Of the part spherical surfaces being coincident and on the crankshaft axis. This provides mating spherical surfaces which may be sealed by metal ring seals.

The connecting rods may connect the respective pistons to a crank or respective cranks of the crankshaft assembly. Furthermore, if desired the cranks of each respective bank of cylinders could be staggered about the centre line of the crank shaft. Where axially spaced cranks are utilized to reciprocate respective pistons, each crank and piston bank assembly is associated with a respective mating pair of spherical sealing surfaces associated with the cylinder assembly and the closure means. Preferably however a plurality of pistons are connected to a common crank pin of the crankshaft assembly and the cylinder axes lie in a common radial plane. It is also preferred that the part spherical surfaces described above be centered on the intersection of the common radial plane containing the cylinder axes and the axis of rotation of the crankshaft.

Suitably the timing connection between the cylinder assembly and the crankshaft is such that top dead centre of the pistons in the respective cylinders occurs at a common or common positions with respect to fixed inlet or outlet ports.

Preferably the cylinder assembly is adapted to contrarotate at a reduced speed compared to the crankshaft and at a reduction ratio equal to one divided by the number of cylinders in the cylinder assembly. That is in a three cylinder engine the cylinder assembly is adapted to rotate at one third the speed of rotation of the crankshaft assembly and in the opposite direction. Suitably the engine is adapted as a multi-cylinder engine having a uneven number of cylinders.

In a Preferred embodiment of the invention the engine is adapted as an internal combustion engine and the inlet and outlet ports in the cylinder head communicate with the fuel intake and exhaust means respectively.

BRIEF DESCRIPTION OF THE DRAWINGS

In order that this invention may be more readily understood and put into practical effect reference will now be made to the accompanying drawings which illustrate typical embodiments of The present invention and wherein.

DESCRIPTION OF THE PREFERRED EMBODIMENT

Figure 1:
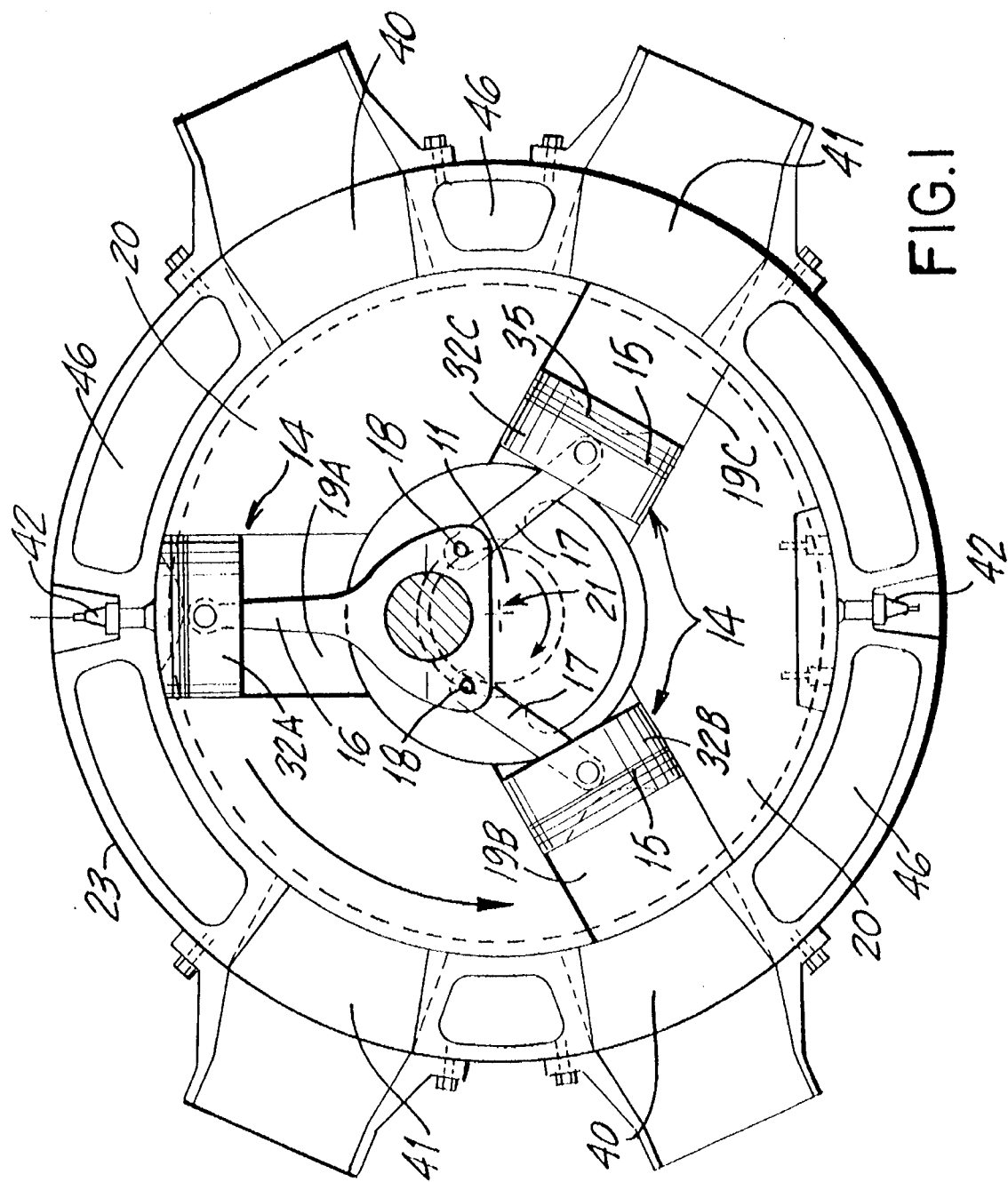
FIG. 1 is a diagrammatic end view of a three cylinder four-stroke radial engine according to the present invention.

As illustrated in FIGS, 1 and 3, a three cylinder radial engine 10 according to this invention includes a crank shaft 11 supported for rotation within a crankcase 12 and having a single crank pin 13 to which three piston assemblies 14 are connected. One piston assembly is connected directly to the crank pin 13 by the connecting rod 16 while the remaining pistons 15 are connected indirectly to the crank pin 13 by connecting rods 17 which attach to pivot mountings 18 at the inner end of the connecting rod 16.

Figure 2:
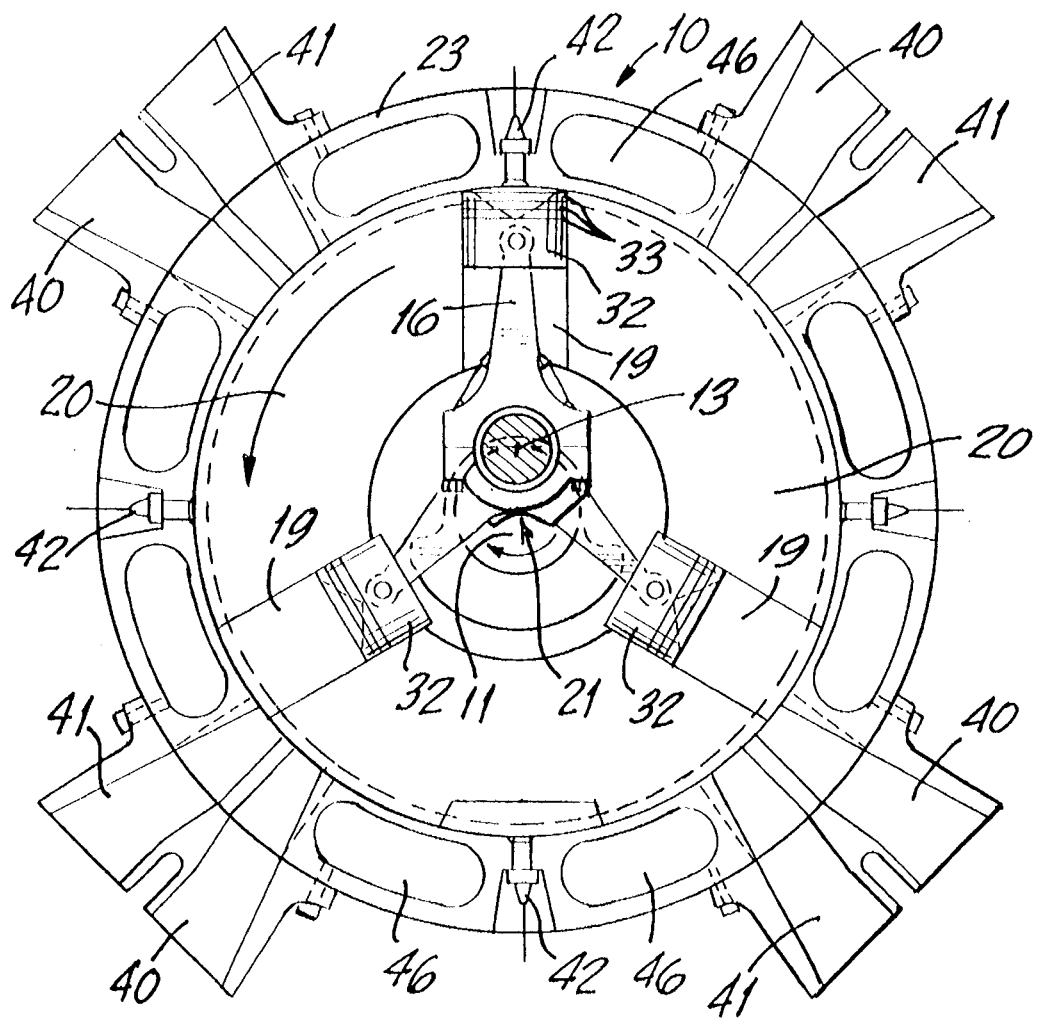
FIG. 2 is a diagrammatic end view of a three cylinder two-stroke radial engine according to the present invention.
Figure 3:
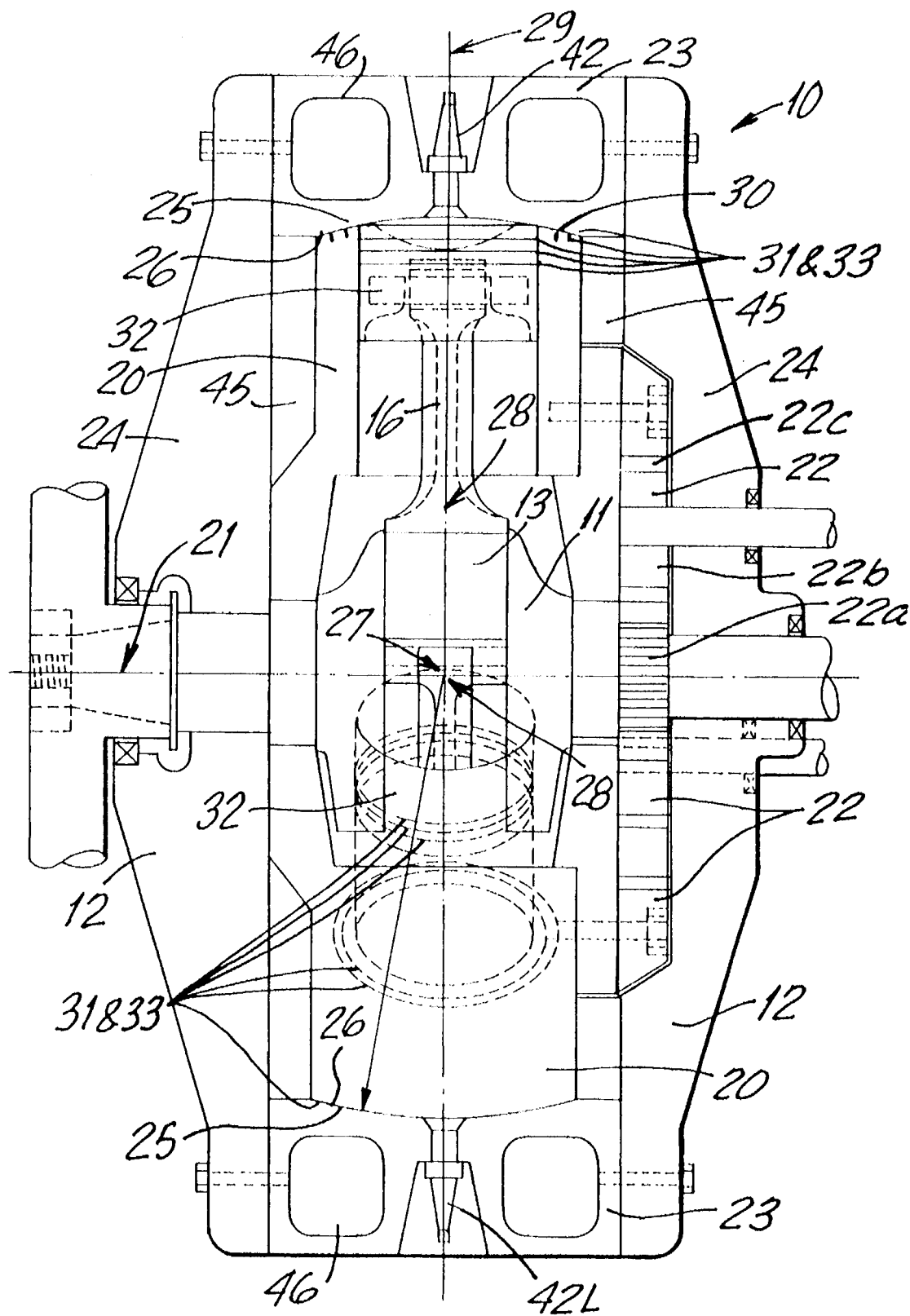
FIG. 3 is a diagrammatic transverse sectional view through The engine illustrated in FIG. 1.
Figure 4:
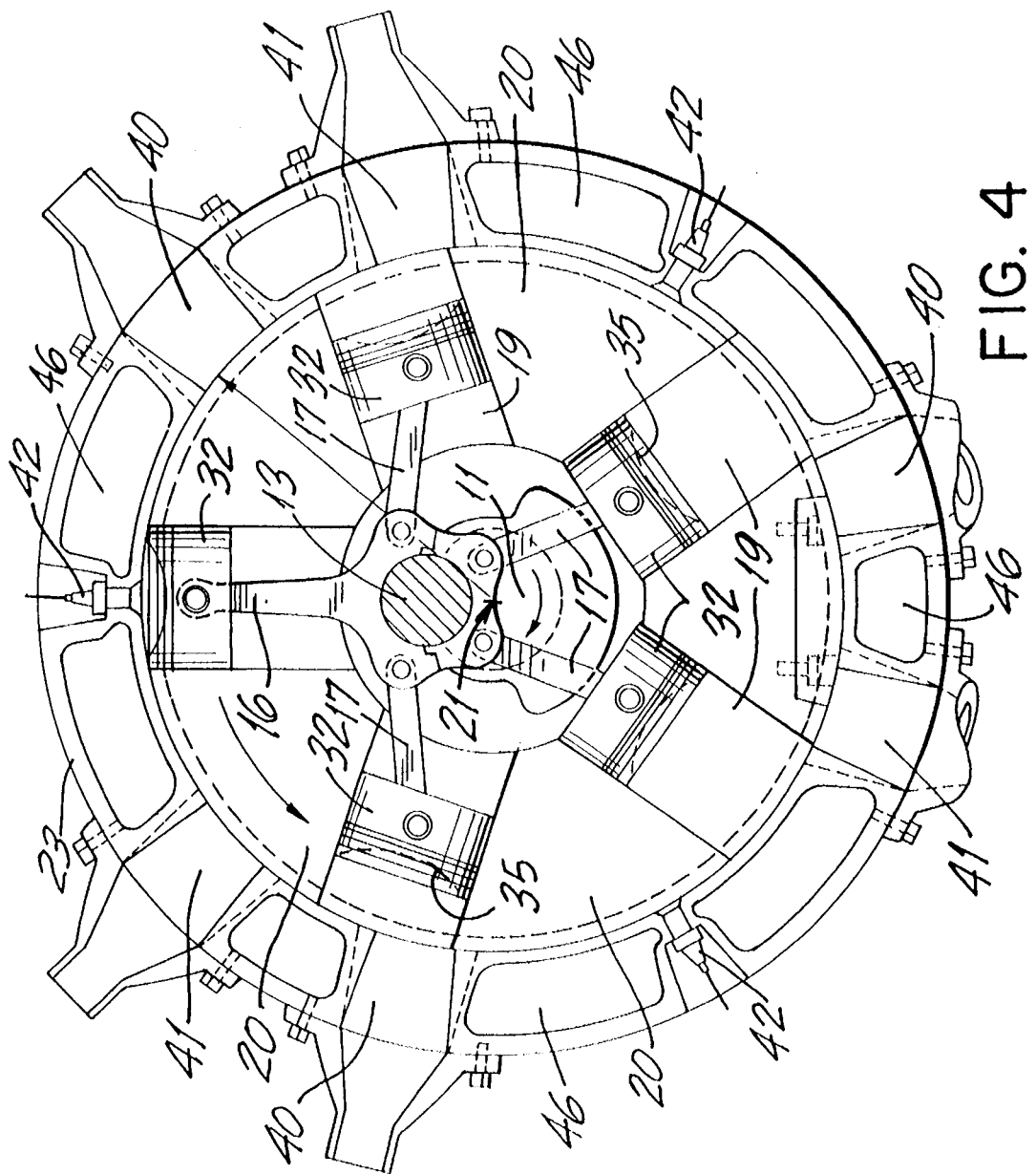
FIG. 4 is a diagrammatic end view of a five cylinder four-stroke radial engine according to the present invention.

In the embodiment illustrated in FIG. 2 the inner ends of the connecting rods 16 and 17 are connected directly to the crank pin 13, The pistons 14 and 15 reciprocate within respective cylinders 19 formed in a rotary cylinder assembly 20 rotatable within the crankcase 12 about the crank shaft axis 21 and connected thereto by a gear train assembly 22 whereby the cylinder assembly 20 contra-rotates with respect to the crankshaft 11 at one-third the speed of rotation thereof. The gear train includes a sun gear 22a mounted on the crankshaft 11, idler gears 22b spaced around and engaged with the sun gear 22a and meshing with an internal annulus gear 22c fixed to the rotary cylinder assembly 20 whereby it contrarotates to the crankshaft 11.

A cylinder closure assembly 23 extends around the rotary cylinder assembly 20 and is fixed between the opposed end walls 24 of the crankcase assembly 12. The outer surface 25 of the cylinder assembly 20 and the mating inner surface 26 of the cylinder closure assembly 23 are part spherical surfaces centred at point 27, the intersection of the crankshaft axis 21 and the axes 28 of the cylinders 19 which are contained in a common radial plane indicated by the centreline 39 in FIG, 3.

This arrangement is such that the park spherical land 30 about each cylinder 19 is provided with constant depth ring grooves 31 concentric with the cylinder axis and in which metal ring or split-ring type seals 33 can be located, as illustrated, for forming a seal between the cylinder assembly 20 and the cylinder closure assembly 23 and about each respective cylinder 19.

Thus conventional sealing technology may be utilised to provide the seal between the rotary cylinder assembly 20 and the stationary cylinder closure assembly 23. Of course conventional piston rings are used in conventional manner to effect a seal between the pistons 32 and the cylinder bores 19.

The cylinder closure assembly is provided with two sets of inlet and outlet ports designated as 40 and 41 respectively and a pair of spark plugs/fuel injectors 42 intermediate the inlet and exhaust ports 40/41 of each pair. The ports 40 are adapted for connection to a suitable air or air/fuel inlet means while the ports 41 are adapted for connection to a suitable exhaust manifold.

In the engine illustrated in FIG. 1, the piston 32A is in a top dead centre position with respect to cylinder 19A at which combustion can be effected by spark ignition or compression ignition of the compressed fuel/air mixture in the combustion chamber. In this embodiment the combustion Chamber 34 is formed between a recess in the piston crown as illustrated by the dotted outline at 35 and the closure assembly 23.

Upon one revolution of the crank shaft 11 in the clockwise direction, the cylinder 19A will have advanced 120° anticlockwise to the position of the cylinder 198 and the piston 19A will have performed a complete down stroke, passing the exhaust port 41 in the process, a complete upstroke for return to the top dead centre position within the cylinder 19A just prior to that cylinder communicating with the inlet port 40 and a substantial portion of the next downstroke whereby in use, fuel/air mixture will be induced into the cylinder 19A through the port 40.

During the next complete revolution of the crankshaft 11 the piston 19A will have again moved to and beyond top dead center within the cylinder 19A at which combustion can be performed by the lower spark plug 42L prior to the cylinder assembly 20 advancing in the anticlockwise direction to the position of piston 32C and with the piston at the lower part of the cylinder at the commencement of the exhaust upstroke until the piston again is positioned in the top dead centre position just prior to passing the inlet port 40 for commencement of a further cycle of operations.

Accordingly whereas a conventional three cylinder four-stroke engine would provide three power strokes for every two full rotations of the crank shaft. The present engine provides six power strokes for three revolutions of the crank shaft or two per revolution which is equivalent to a four cylinder four-stroke engine. Furthermore it will be seen that the side loading on each piston assembly 32 during the power stroke is in the direction of rotation of the cylinder assembly 20 whereby that rotation is enhanced by the piston side load.

If desired the inlets 40 can be air inlets only and the spark plugs 42 can be associated with fuel injection means for direct injection of the fuel into the air compressed within the combustion chamber of each piston and cylinder assembly. The engine is suitably oil cooled with oil passages 45 formed about the outer portions of the cylinder assembly 20. In addition coolant passages 46 may be provided around the closure means 23. The coolant passage 46 may also be oil cooled or it may use a different coolant if desired.

Figure 6:
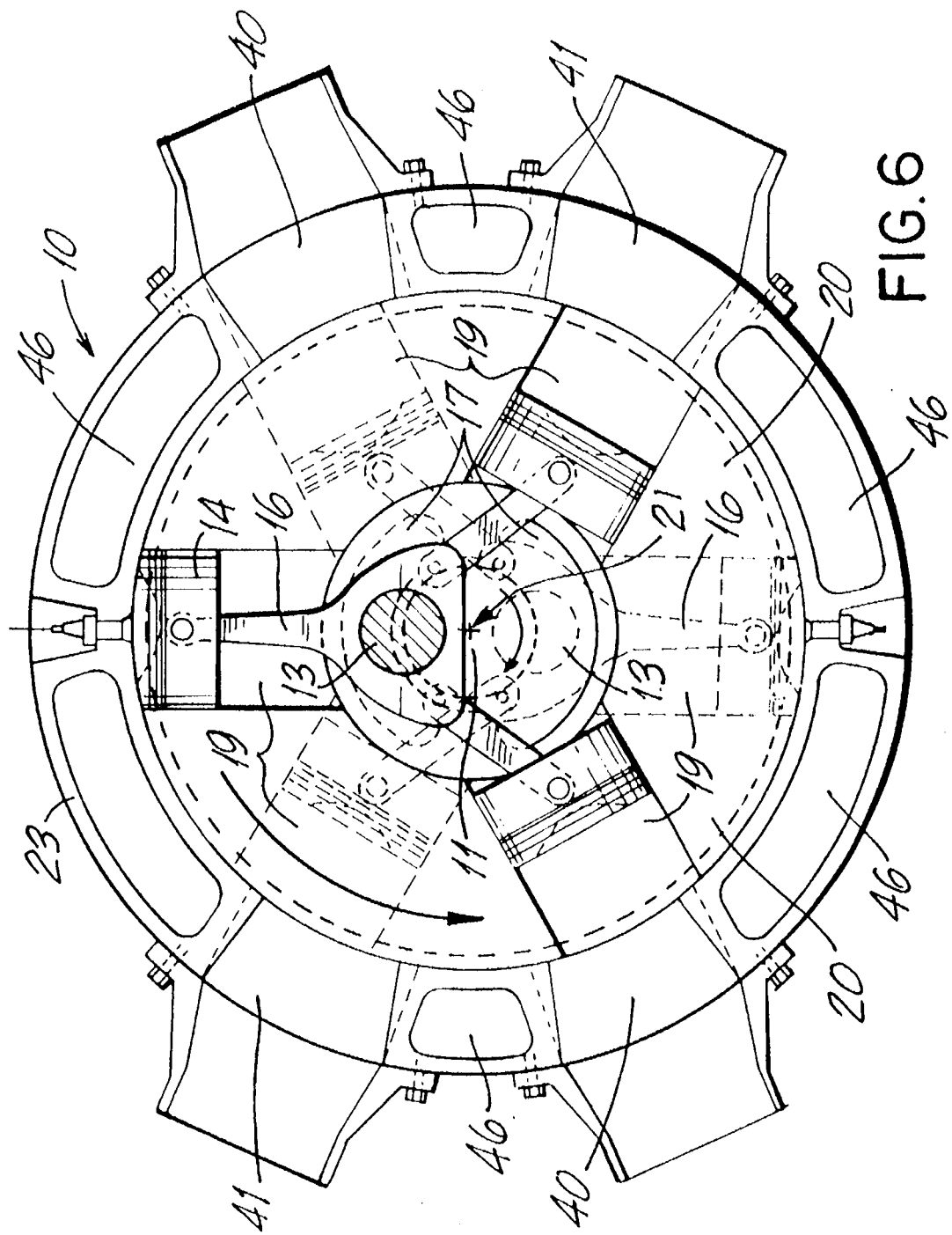
FIG. 6 is a diagrammatic end view of a six cylinder four-stroke radial engine according to the present invention.
Figure 7:
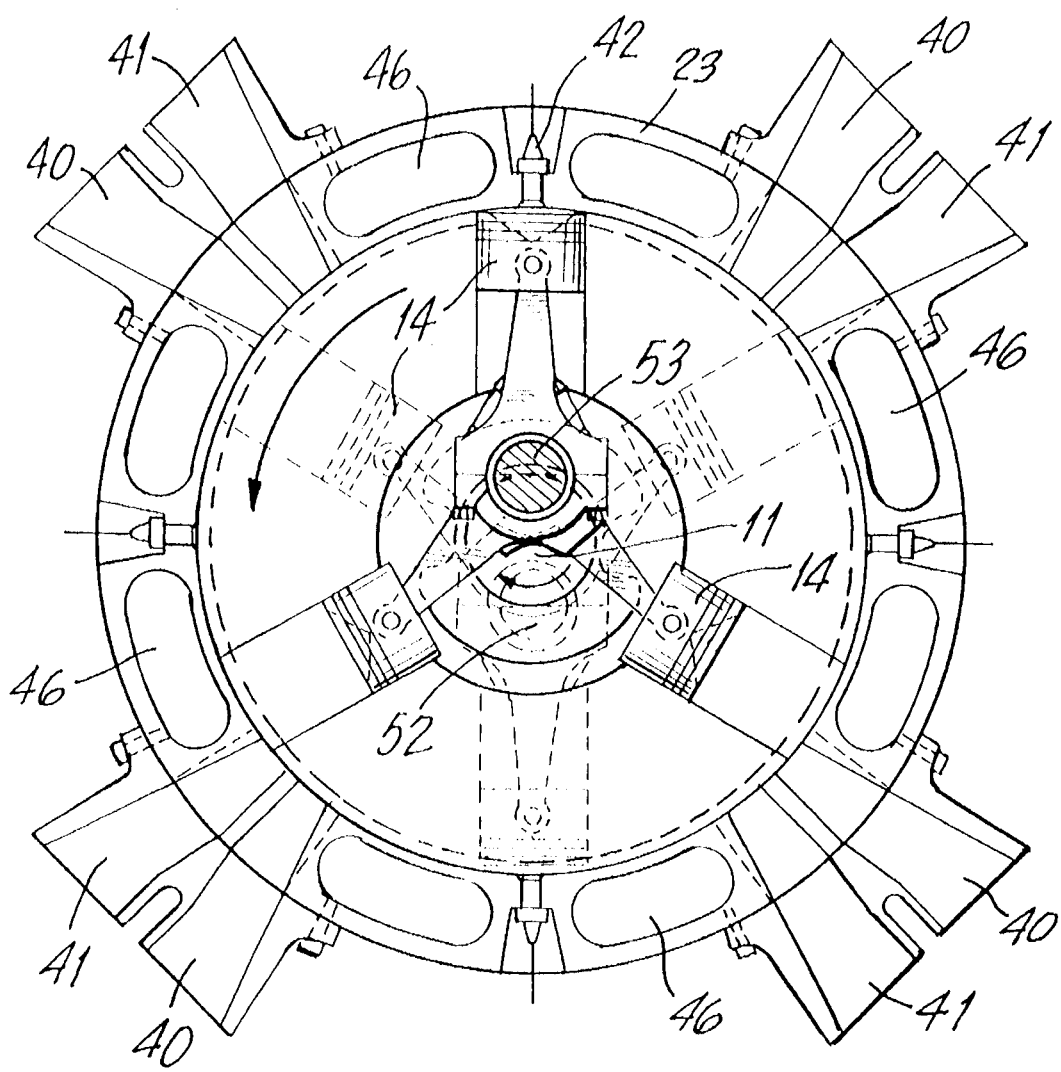
FIG. 7 is a diagrammatic end view of a six cylinder two-stroke radial engine according to the present invention.
Figure 8:
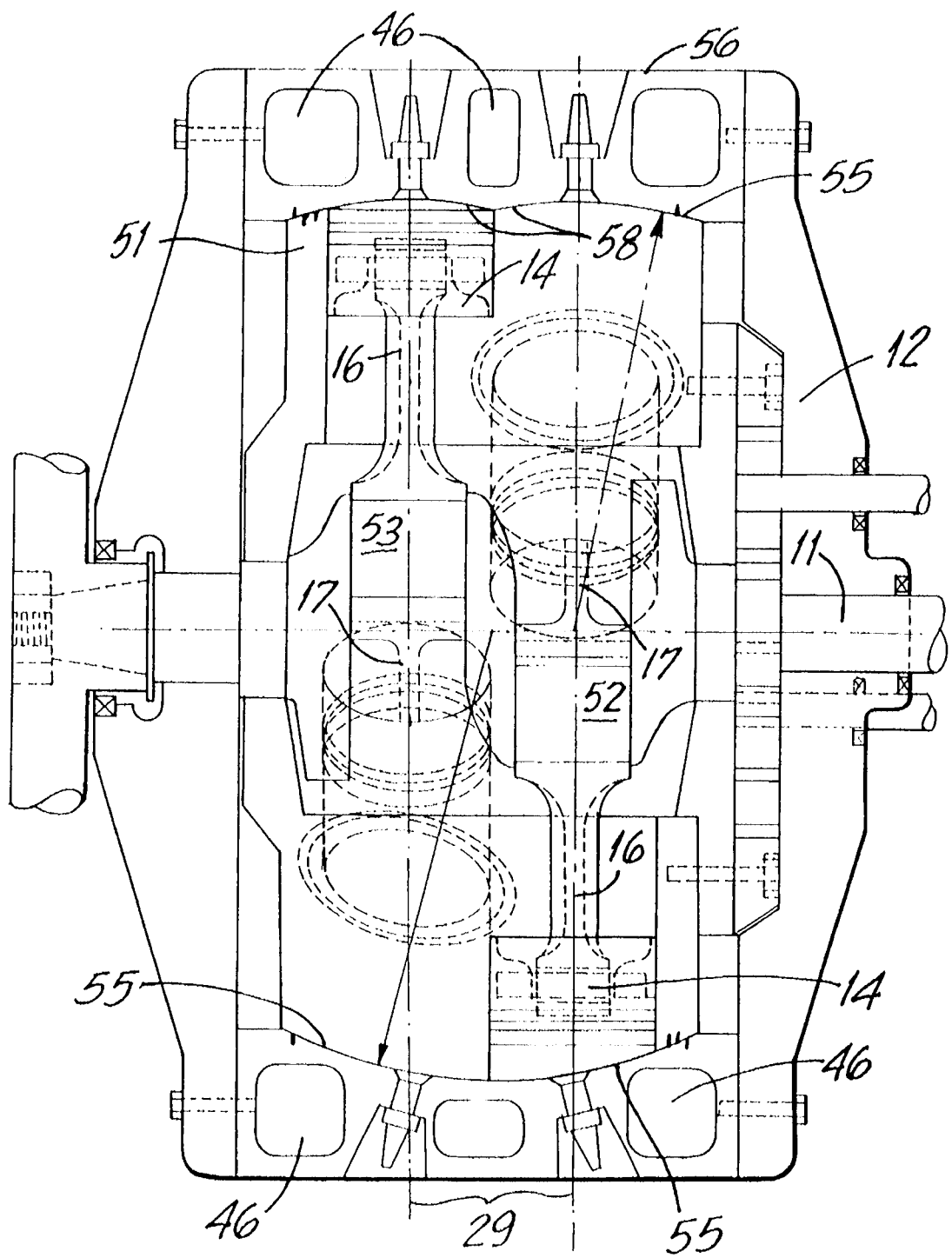
FIG. 8 is a diagrammatic transverse sectional view through the engine illustrated in FIG. 6 or FIG. 7.

It will also be seen that the position and size of the inlet and outlet ports 40/41 may be arranged to suit the particular application and of course if desired they can be arranged to overlap one another. Furthermore the communication between the inlet and outlet ports with the cylinder can be varied independent of each other and of course banks of each of the three cylinder motors may be arranged along a common crank shaft or interconnected crank shafts as illustrated in FIGS. 6, 7 and 8.

Referring to the latter embodiments of the invention it will be seen that the engines have two banks of cylinders 50 and 51 arranged with the cylinders of each bank having their axes in a common radial plane centered on a respective crankpin 52, 53. The section of FIG. 8 is diagrammatic as it illustrates alternate cylinder closure arrangements at the top and bottom of the section. The part-spherical surface or surfaces of the cylinder closure assembly 56 may be either a common part-spherical surface concentric with the centre of the engine as illustrated at 55 in FIG. 8 by the radius line designated Red. B, or separate part-spherical surfaces 58 concentric with the centre of each cylinder array as illustrated by the radius line designated Red. A in FIG. 8.

Figure 10A:
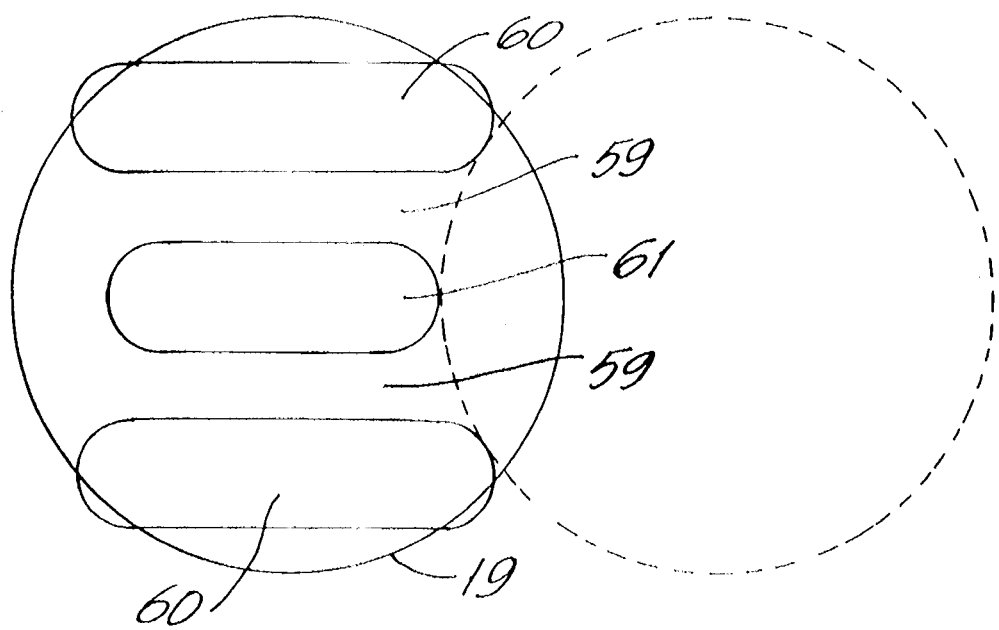
FIG. 10 illustrates a typical porting arrangement for the present invention.
Figure 10B:
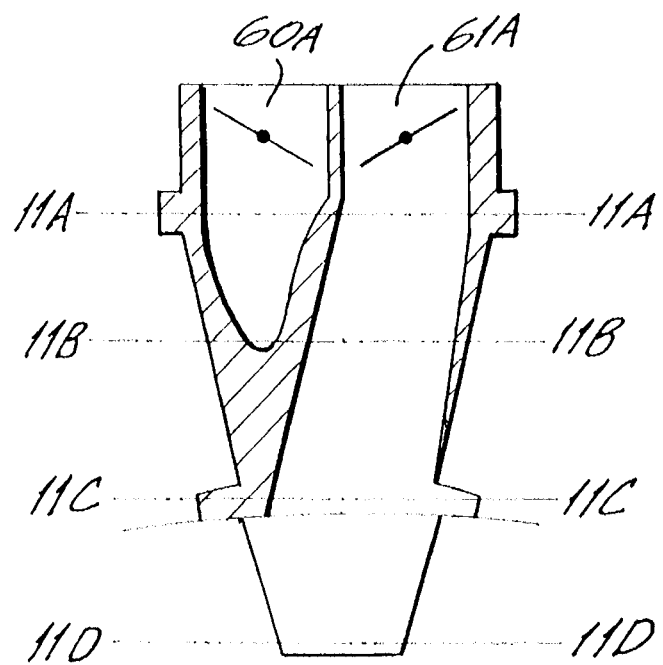
Figure 11A:
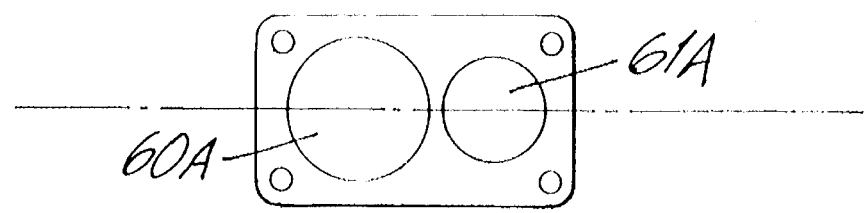
Figure 11B:
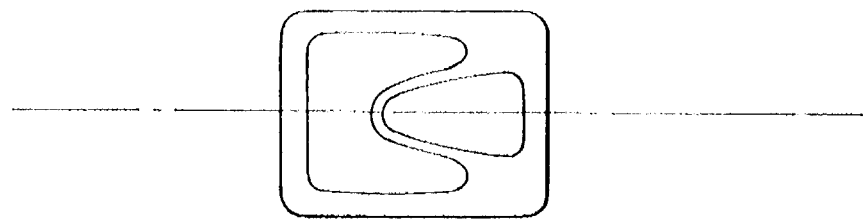
Figure 11C:
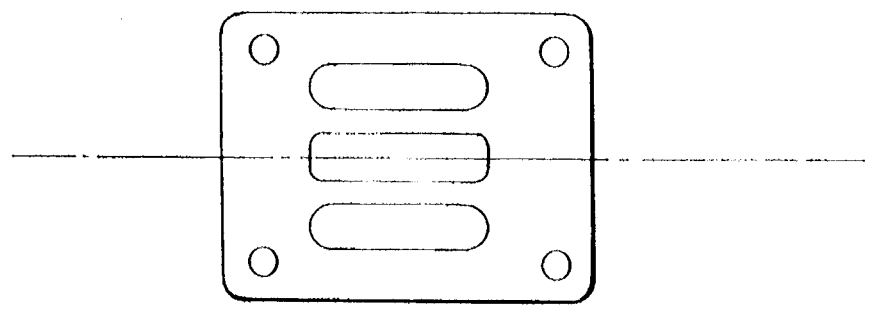
Figure 11D:
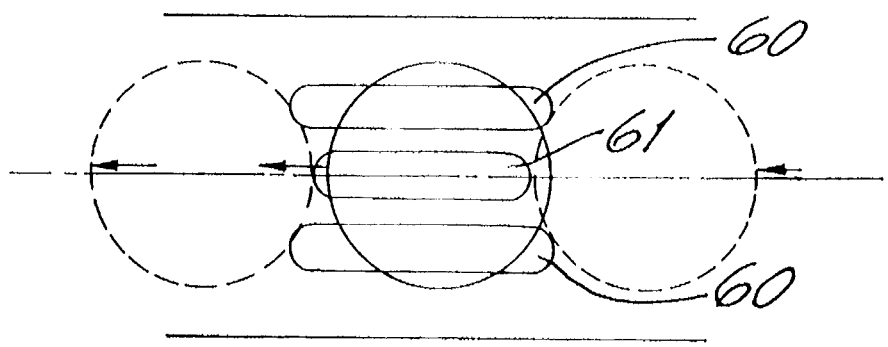

Referring to FIG. 10 it will be seen that the cross-sectional area of the exhaust ports or inlet ports can be made relatively large compared to the cross-sectional area of corresponding ports in a conventional four-stroke engine which should provide efficient breathing of the engine. Furthermore exhaust gas scavenging is assisted by the rotation of the cylinder assembly. Suitably the ports incorporate bridges 59 adapted to minimize possible damage to the metal sealing rings 33 during passage of the cylinders across the ports 60 and 61.

In addition the bridges 59 may divide the ports 60 and 61 into outer long ports 60 connected to a secondary barrel of a carburetor or the like (not shown) for high speed performance and an inner short port 61 connected to primary barrel of a carburetor for low speed performance. The inner port 61 extends about the common radial plane 29 and affords substantially axial entry of combustible mixture to the respective cylinders, substantially along their axes.

Figure 9:
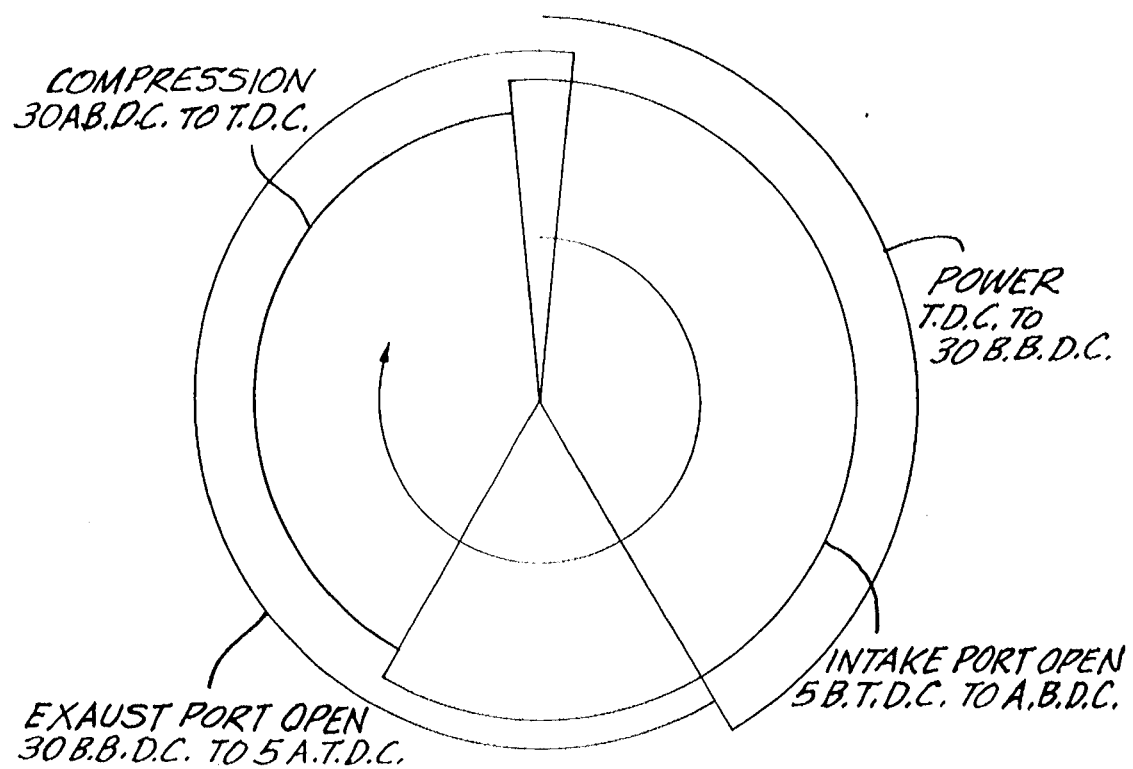
FIG. 9 is a port timing diagram.

A typical timing diagram for this engine is illustrated in FIG. 9.

The ports 60 and 61 may be formed with the outer long ports 60 providing a longer port communication with the cylinder than the inner short port 61 for enhanced high speed performance. Thus the differential opening of the primary and secondary barrels on demand, in conventional manner, effectively provides automatic variable induction timing to enhance performance characteristics.

Another advantage which may be achieved by the present invention relates to the reduction and power loss normally associated with a reciprocating piston. In the present invention the piston motion is a combination of reciprocating motion within the cylinders and rotary motion within the cylinder assembly. As a result acceleration and deceleration forces required to change the direction of the piston within The cylinder are reduced resulting in less internal losses within the engine.

Figure 5:
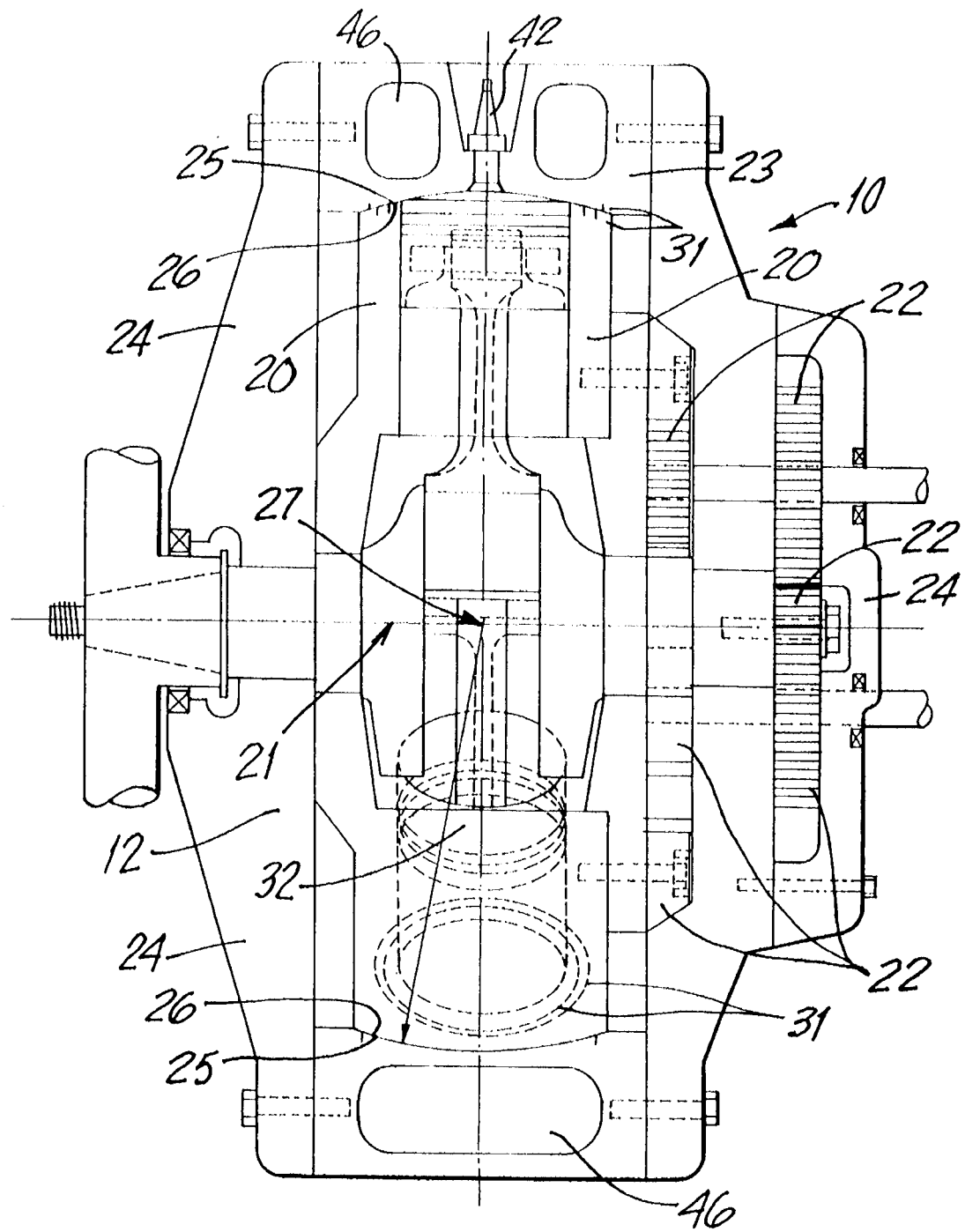
FIG. 5 is a diagrammatic transverse sectional view through the engine illustrated in FIG. 4.

The operation of the two-stroke engines illustrated in FIGS. 2, 5 and 8 is similar in operation to the above described embodiment and similar numerals are applied to like components. However there are twice the number of ports as the corresponding four-stroke versions and a corresponding increase in the number of spark plugs/fuel injectors, and in a three cylinder engine four spark plugs and four sets of ports. In this arrangement there is no provision for an induction cycle and thus forced induction by supercharging or turbocharging or the like will be required. The five and six cylinder engines illustrated have similar working configurations to the three cylinder engines described.

In all cases it will be appreciated that the engines of the present invention have fewer moving and stationary parts than conventional engines while at the same time providing the necessary attributes such as large unimpeded ports and the like which should enable the engines to rev to a relatively high speed or operate efficiently at low speeds. Furthermore all manufacturing functions of the present invention are relatively straight forward using existing technology. Of course if desired ceramic or other nonmetallic components can be used in selected applications to further enhance the performance of engines made in accordance with the present invention.

From the above it will be seen that engines made in accordance with this invention will have a short crankshaft which may be relatively light and stiff. Manufacturing techniques and components are relatively simple, utilizing circular shape seals throughout the engine. The engines have relatively few moving parts and power strokes overlap to enable smooth operation to be provided. If desired the engine may be designed for operation on petroleum, diesel, kerosene or natural gas or the like.

It will of course be realised that the above has been given only by way of illustrative example of the invention and that all such modifications and variations thereto as would be apparent to persons skilled in the art are deemed to fall within the broad scope and ambit of the invention as is defined in the appended claims.

I claim:

1. An engine assembly including:

a crankcase assembly;

a crankshaft assembly supported by said crankcase assembly;

a cylinder assembly rotatable relative to said crankcase assembly about said crankshaft assembly, said cylinder assembly having an uneven number of cylinders disposed radially about the crankshaft assembly and with axes disposed in a common radial plane;

respective piston assemblies connected to said crankshaft assembly for operation within said cylinders;

cylinder closure means supported fixedly by said crankcase assembly for closing said cylinders and having a part-spherical inner closure surface sealably engaged with the cylinders;

inlet and outlet ports through said part-spherical inner closure surface through which fluid may be introduced into or expelled from said cylinders, the inlet and outlet ports being grouped in pairs of circumferentially spaced inlet and exhaust ports and the number of pairs of circumferentially spaced pairs of inlet and exhaust ports being equal to one half of the sum of one plus the number of cylinders; and timing means interconnecting the crankshaft assembly to the cylinder assembly such that said cylinder assembly may rotate in a direction opposite to the direction of rotation of said crankshaft assembly at a rotational speed equal to the rotational speed of said crankshaft assembly divided by the number of cylinders;

wherein:

each said inlet port includes a primary circumferentially extending port which extends substantially radially through the cylinder closure means and across the common radial plane containing the cylinder axes and communicating with a primary barrel of a fuel/air supply device for supply of fuel or air to the engine during low speed operation of the engine, and a secondary circumferentially extending port disposed offset from the plane containing the cylinder axes and communicating with a secondary barrel of a fuel/air supply device for supply of fuel or air to the engine only during high speed operation of the engine.

2. The engine assembly of claim 1, wherein an outer surface surrounding each said cylinder lies in a common part-spherical surface operatively conforming to the part-spherical inner closure surface.

3. The engine assembly of claim 2, wherein each said outer surface surrounding respective said cylinders supports a metal ring seal which forms a sliding seal between said outer surface surrounding each said cylinder and said part-spherical inner closure surface.

4. The engine assembly of claim 3, wherein said part-spherical inner closure surface has a center coincident with the intersection of said common radial plane and the axis of rotation of said crankshaft assembly.

* * * * *